Patented Aug. 25, 1925.

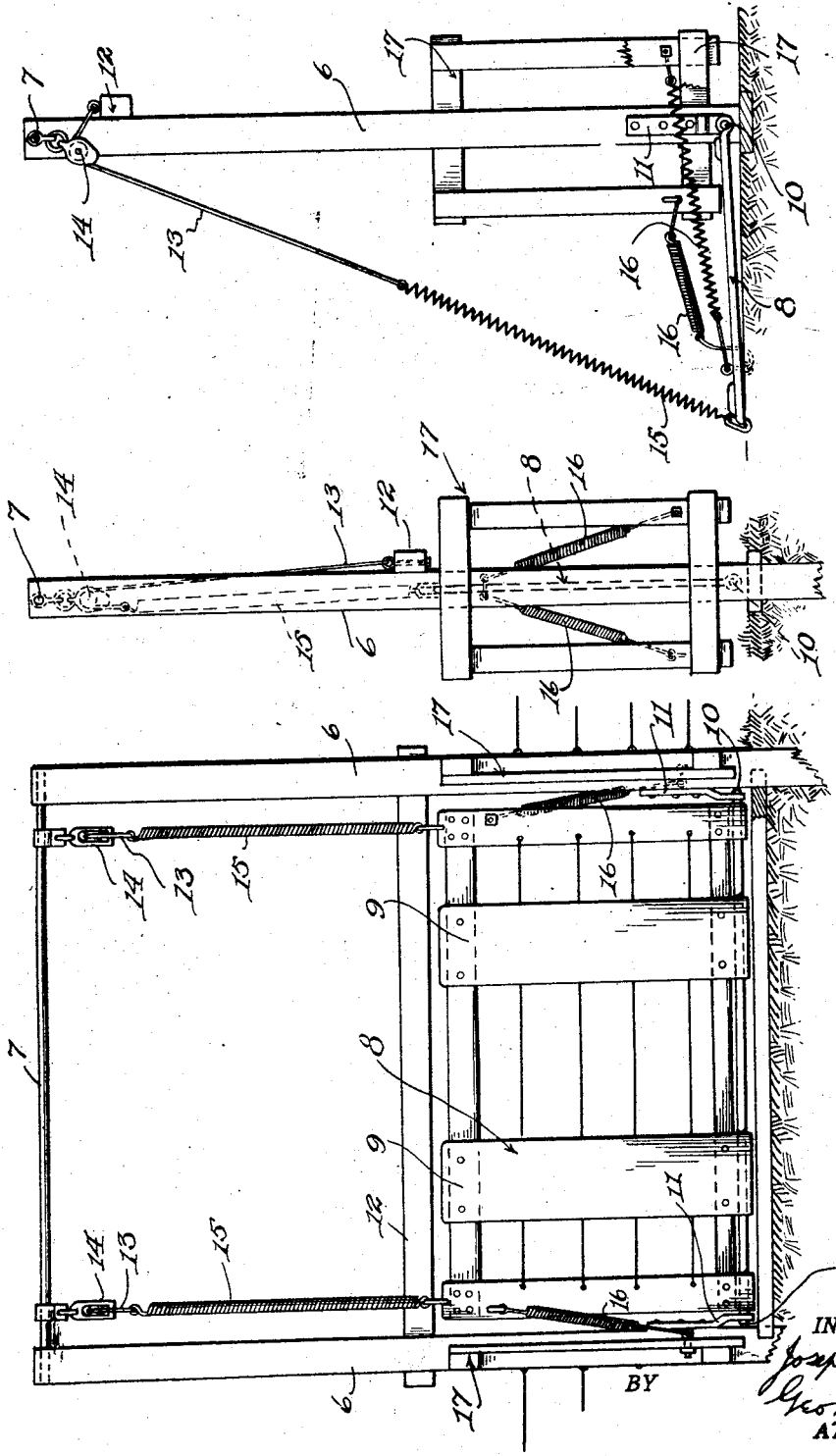

1,551,340

UNITED STATES PATENT OFFICE.

JOSEPH A. SMITH, OF PITTSVILLE, MISSOURI.

GATE.

Application filed January 6, 1925. Serial No. 854.

*To all whom it may concern:*

Be it known that I, JOSEPH A. SMITH, a citizen of the United States, residing at Pittsville, in the county of Johnson and State of Missouri, have invented certain new and useful Improvements in Gates, of which the following is a specification.

This invention relates to gates, and has for its special object to provide a gate which may be opened by running an automobile against it, and which will automatically close after the automobile passes over it. The gate will be found specially useful as a farm gate leading in from the highway, but may be used wherever such a gate is desirable.

The gate is of the horizontally pivoted type. That is, it is pivoted at the bottom, to lie down flatly on the ground as an automobile passes over it; and after the automobile passes, the gate will be lifted to upright position by spring devices connected thereto.

In connection with the gate a bar is provided which will normally prevent horses and larger animals from forcing the gate down; and small animals will ordinarily not be able to exert the strength sufficient to force the gate open. A pair of shields or guards at each side of the gateway also assist in preventing animals passing thru the same. The bar referred to is so connected with the gate as to lift when a vehicle passes thru, to allow the latter to pass thereunder, and when the gate rises the bar lowers to original position.

The apparatus will also be found to have certain other advantages of construction as will more fully appear from the following description.

In the accompanying drawings, Fig. 1 is a side elevation of the gate closed. Fig. 2 is an end elevation. Fig. 3 is a vertical section with the gate open.

The gate may be mounted between two gate posts, or it may be set in a frame made of any suitable material. A pair of posts 6 are shown. These are tall enough to exceed the height of an automobile and are provided at the top with a cross bar 7 which spans the gateway. The gate consists of a panel 8 which may be of any desired construction, sufficient to stand the weight of an automobile or other vehicle. Preferably it will have a pair of tread plates 9 of sufficient strength and rigidity to allow the wheels of a vehicle to travel over the same. This panel is pivoted at the bottom by pintles 10 extending horizontally beyond the edges of the panel, at the bottom thereof, and hung in brackets 11 fixed to the posts or side frames. Accordingly the gate can swing down upon the ground when sufficient pressure is applied thereto, as by the bumper or front wheels of an automobile, and the gate will then lie down in front of the vehicle, in either direction, to allow the vehicle to pass thereover. It is normally retained in upright position by means to be described. 12 is a cross bar slidable up and down at one side of the gateway, and this bar is long enough for its ends to lap the posts, or it may be provided with guides to confine its up and down movement. Ropes 13 are connected to the bar and pass over pulleys 14 to connection with the upper ends of coil springs 15, the lower ends of which are connected to the top of the panel 8. These springs, therefore, when extended, will tend to lift the gate to upright position, and this action is assisted by the weight of the bar 12. Also, to further normally maintain the gate in upright position, I provide at each side thereof a coiled spring 16 connected to the panel and extending outwardly at an angle to connection with a guard 17. When the gate is swung down, one of these springs is extended and the other is collapsed, but when the vehicle runs over the gate, the extended spring assists in lifting the gate to upright position. The guards 17 consist of posts and bars set at each side of the gateway and projecting outwardly a sufficient distance to assist in preventing animals from crawding between the gate and the post, if they should press the gate either way to a limited extent.

In the use of the device, the gate is normally upright, and the bar 12 is down to such position that larger animals, such as horses and cattle, attempting to force the gate, will press against the bar, without result. When an automobile approaches the gate, its bumper or wheels are forced against the same, and the gate will be swung down. As it swings down the rope connection to the bar 12 will lift the latter, permitting the automobile to pass thereunder, and at the same time the springs 15 and 17 are elongated until the gate lies flatly upon the ground and the automobile can then travel thereover. After it passes the gate, the springs lift the latter to upright position, the bar 12 dropping to original position. The gate may be operated by an automobile from either direction and will automatically return to original position when released. When a horse-drawn wagon has to pass thru the gateway, the gate can be pushed down by hand or foot, and held down until the wagon passes.

The invention is capable of various modifications and is not limited to the particular form shown and described.

I claim:

1. A gate comprising a panel horizontally pivoted at the bottom between gate posts, a bar slidable up and down beside the posts, pulleys supported above the panel, and cables connecting the bar and the gate and passing over said pulleys.

2. A gate as set forth in claim 1, said cables including extensible springs between the pulleys and the panel.

3. In a gate, in combination, a pair of gate posts, a top cross bar between the same, a panel horizontally pivoted at its lower edge between the posts, pulleys hung from the cross bar, a bar slidable up and down beside the posts, cables connected to the slidable bar and extending over the pulleys, and extensible springs connecting the cables and the top of the gate.

4. The combination of gate posts, a swinging panel horizontally pivoted at its lower edge between the same, spring means tending to hold the panel in upright position but permitting it to swing down for passage thereover, and a pair of guards projecting laterally beside the gate posts.

In testimony whereof, I affix my signature.

JOSEPH A. SMITH